United States Patent [19]

Imler

[11] 4,210,436
[45] Jul. 1, 1980

[54] METHOD OF IMPRESSING AN ACCENT LINE IN BENT GLASS SHEETS WITH A HEATED TUBE

[75] Inventor: Vaughn R. Imler, Tyrone, Pa.

[73] Assignee: PPG Industries, Inc., Pittsburgh, Pa.

[21] Appl. No.: 26,108

[22] Filed: Apr. 2, 1979

[51] Int. Cl.² ............................................. C03B 23/02
[52] U.S. Cl. .......................................... 65/106; 65/273; 65/287
[58] Field of Search ................ 65/106, 107, 273, 275, 65/287

[56] References Cited

U.S. PATENT DOCUMENTS

| | | | |
|---|---|---|---|
| 3,089,727 | 5/1963 | Hay | 294/118 |
| 3,340,037 | 9/1967 | Stevenson | 65/287 |
| 3,367,764 | 2/1968 | Seymour | 65/291 |
| 3,421,875 | 1/1969 | Kirkman | 65/273 |
| 3,477,840 | 11/1969 | Oelke | 65/287 |
| 3,595,636 | 7/1971 | Posney | 65/287 |
| 3,795,501 | 3/1974 | Jansson et al. | 65/106 |
| 3,795,570 | 3/1974 | Jansson et al. | 65/100 |
| 3,879,184 | 4/1975 | Hamilton et al. | 65/107 |
| 4,081,263 | 3/1978 | Mestre et al. | 65/106 |

Primary Examiner—Arthur D. Kellogg
Attorney, Agent, or Firm—Dennis G. Millman

[57] ABSTRACT

An accent line is produced in a glass sheet by pressing a tubular member against the glass sheet as it is being press bent. The tubular member is heated by passing hot fluid, e.g., air, therethrough.

6 Claims, 6 Drawing Figures

METHOD OF IMPRESSING AN ACCENT LINE IN BENT GLASS SHEETS WITH A HEATED TUBE

BACKGROUND OF THE INVENTION

Automotive designers have from time to time deemed it desirable to provide automobile windows with accent lines, particularly the rear window or "backlight" of an automobile. Such an accent line gives the illusion of two sheets of glass butted together, or of a much more sharply bent portion than is actually provided.

Prior to the present invention, the customary way of providing such an accent line on a pirce of glass has been to grind a groove into the glass surface prior to bending. Since such a technique entails a separate process step which adds to production costs, a different technique for providing an accent line would be desirable. Accordingly, it is an object of the present invention to create an accent line in a glass sheet simultaneously with the bending thereof.

U.S. Pat. No. 4,081,263 discloses the use of a rod or cylinder as a fulcrum for initiating the bending of a glass sheet to a sharp curvature. Such a procedure is not pertinent to the production of an accent line of the type to which the present invention pertains actual sharp bending of the glass sheet is basically different from producing an accent line. Rather, an accent line is an impression in the glass surface at a location on the glass sheet otherwise possessing a relatively gentle curvature. For these reasons, the rather substantial body of prior art relating to the production of "V-bends" in glass sheets is not pertinent to the present invention. Additional examples of such prior art V-bending techniques may be found in U.S. Pat. Nos. 3,795,570 and 3,795,501.

The following references may be pertinent to the novel aspects of the present invention. U.S. Pat. Nos. 3,421,875 and 3,477,840 disclose the use of furnace gas to heat a press bending mold. U.S. Pat. No. 3,595,636 discloses supplying a bending mold with heated gases generally. U.S. Pat. No. 3,340,037 discloses an arrangement for concentrating the impingement of heated gases onto particular portions of a glass sheet being bent within a furnace.

In copending U.S. patent application Ser. No. 26,107, filed on even date herewith by George R. Claassen and entitled "Method of Making Accent Lines in Bent Glass Sheets," there is disclosed and claimed the general concept of impressing a solid, rod-shaped object into the surface of a glass sheet during press bending of the glass sheet to produce an accent line. The present invention employs that same general concept, but is directed to a specific alternate embodiment for carrying out that concept.

SUMMARY OF THE INVENTION

The present invention provides a method for imparting an accent line to the surface of a glass sheet as it is being shaped by an otherwise conventional press bending technique. A rigid rod-shaped member is supported in the press bending station between the glass sheet and the face of one of the press bending molds. When the bending molds close upon the glass sheet to impart an overall curvature thereto, the rod member is pressed into a surface of the glass sheet so as to create a line of distortion which appears as an accent line.

In order to avoid localized cooling of the heat-softened glass sheet along the line of contact with the rod member, it has been found desirable to heat the rod member. Localized cooling of the glass sheet should be avoided because it can give rise to undesirable, unbalanced stresses in the glass which can cause cracking or weakening of the glass.

In the arrangement of the present invention, the rod-shaped member takes the form of a hollow tube mounted on the face of one of the press bending molds and through which a heated fluid is passed in order to maintain the surface of the tube at an adequate temperature to avoid thermal shock when brought into contact with the glass surface. The heated fluid is preferably hot air drawn from the adjacent furnace employed to heat the glass sheets to a temperature suitable for bending.

The use of a fluid-heated tube mounted on the bending mold face in the present invention is advantageous because it does not require the cumbersome use of individual line-impressing members which travel with each glass sheet, and because it avoids the need for an electrical hook-up in the vicinity of the bending molds, which can sometimes require extra precautions in order to avoid electrical shock hazards. Furthermore, in the preferred embodiment, heating the line-impressing member by means of hot furnace gases eliminates the need for an independent heat source and economizes on the use of thermal energy.

THE DRAWINGS

DETAILED DESCRIPTION

The methods of producing accent lines of the present invention are useful in conjunction with methods and apparatus for press bending glass sheets which are well known in the art. In particular, the pertinent types of press bending techniques are those in which relatively rigid complementary bending molds close upon opposite sides of a heat-softened glass sheet and engage major portions of both sides of the glass sheet so as to impart the desired curvature thereto. A particular press bending process with which the present invention is illustrated herein is the type wherein each glass sheet is hung vertically from tongs and is pressed between horizontally reciprocated bending molds. This type of press bending arrangement is well known in the art, as exemplified by U.S. Pat. No. 3,367,764 to S. L. Seymour, and a detailed description of the press bending apparatus itself should not be necessary for an understanding of the present invention. However, it should be understood that other press bending arrangements may be employed with the present invention, such as the conventional type of arrangement where each glass sheet is conveyed horizontally between upper and lower bending molds which are vertically reciprocated.

Figure 1:
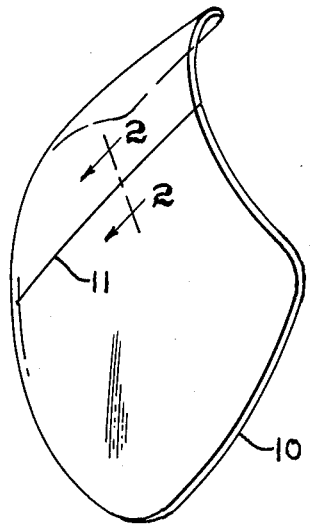
FIG. 1 is a perspective view of a bent glass sheet having an accent line.
Figure 2:
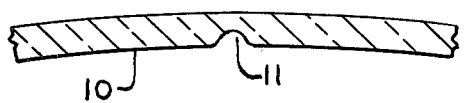
FIG. 2 is an enlarged cross-sectional view taken along line 2—2 in FIG. 1 showing the deformation in the glass surface which characterizes an accent line (shown somewhat exaggerated for the sake of illustration).

FIG. 1 depicts an example of a completed product made in accordance with the present invention, which comprises a bent sheet of glass 10 having an accent line 11 extending drom one side to the other. Such a product would typically be employed as an automobile rear window. In FIG. 2, the enlarged cross-sectional view of the portion of the bent glass sheet in the region of the accent line 11 shows a slight depression in the glass surface, which contributes to the appearance of the accent line. The depth of the depression may be very slight since it is the disturbance of optical uniformity which renders the accent line visible. Part of the optical disturbance may be thermally induced beneath the glass surface as a result of contact with the relatively cool rod member. Thus, the accent lines of the present invention are characterized by a slight surface depression, but the depth of this depression is not necessarily the controlling factor, and in some cases, may be barely perceptible.

Figure 3:
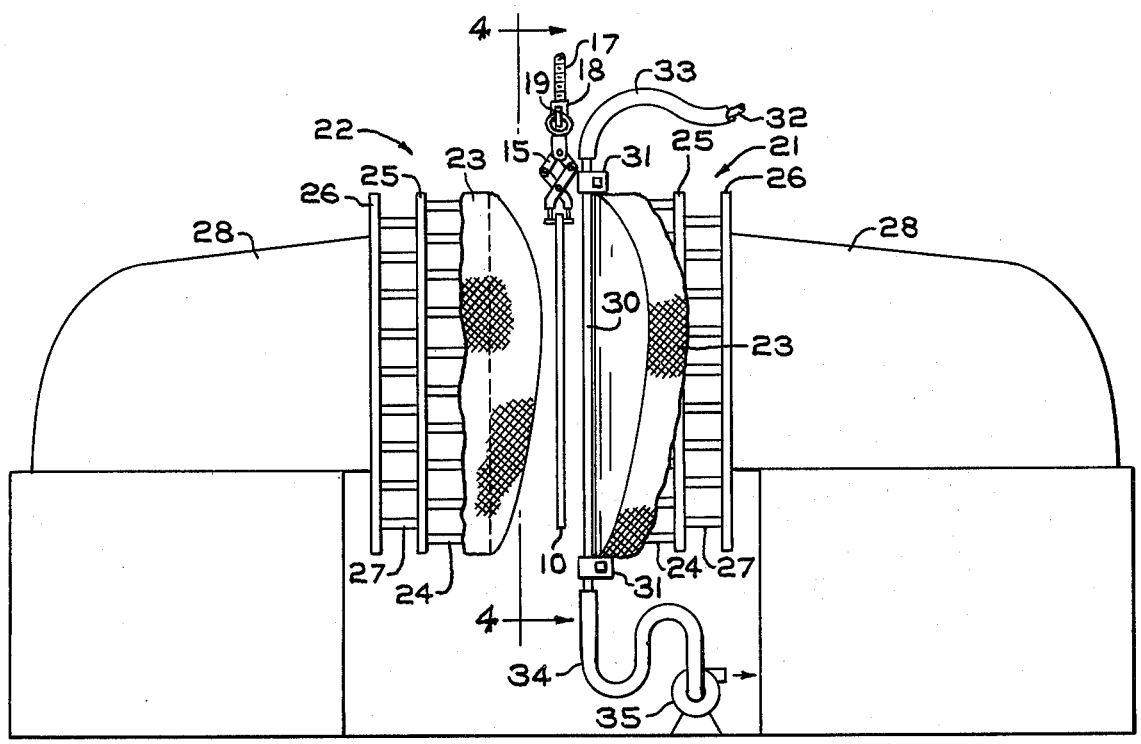
FIG. 3 is a schematic end view of a press bending station with a sheet of glass received therein, showing the heated tube arrangement of the present invention.
Figure 4:
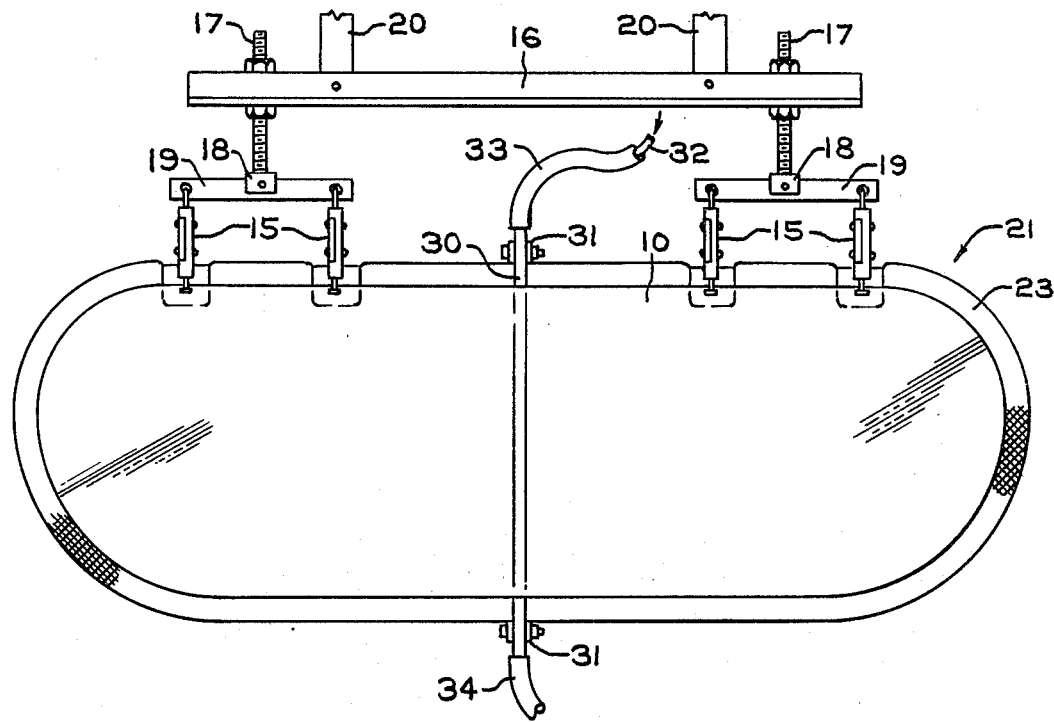
FIG. 4 is a side view of one side of the bending press taken along line 4—4 in FIG. 3.

In FIGS. 3 and 4, a sheet of glass 10, still in the unbent state, is shown vertically hung from tongs 15 in a press bending station, having been heated to a softened condition suitable for bending in a furnace (not shown). The particular tong construction is not critical to the present invention and is well known in the art. An example of a suitable tong arrangement may be seen in U.S. Pat. No. 3,089,727. A typical carriage arrangement for supporting the tongs is depicted in FIG. 4. The carriage is based on a main frame 16 which may be comprised of a pair of angle irons spaced apart to receive a number of vertically extending threaded shafts 17 therebetween. The lower end of each shaft 17 is affixed to a yoke member 18 which in turn pivotably supports a cross-bar 19 on which the tongs 15 are hung. The entire carriage assembly may be supported from above by straps 20, the upper ends of which may be affixed to a car which rides on an overhead stub roller conveyor (not shown).

When the carriage and the glass sheet supported thereon are stopped in the bending station as shown in FIGS. 3 and 4, the glass sheet is aligned between a male press bending member 21 and a female press bending member 22. The face of each of the bending molds may be comprised of a relatively flexible sheet of metal (not shown) covered with a fiber glass fabric 23 and fastened by a plurality of adjusting bolts 24 to a stiffening plate 25. The stiffening plate 25 is in turn affixed to a back-up plate 26 by a plurality of bolts 27. Each bending mold assembly is carried on a horizontally reciprocating ram 28.

The novel aspect of the present invention is the provision of a hollow tube 30 affixed to the face of one of the press bending molds by means of clamps 31 at the top and bottom edges of the mold face. A suitable material for the tube 30 is stainless steel, and an outside diameter of ⅛ inch (3 millimeters) has been found to be satisfactory. The diameter of the tube may vary somewhat, although thinner tubes may be more susceptible to bending and thicker tubes may interfere more with the closing of the bending molds. The tube 30 is heated by the passage of hot fluid therethrough, which may preferably be hot gases (e.g., air) drawn from the glass sheet heating furnace. The hot gases may be supplied through a flexible conduit 32 covered with insulation 33 to prevent heat loss. The hot gases are drawn out of the tube at the opposite end through another flexible conduit 34 which is connected to the suction side of a pump 35 or an aspirator. The flow rate of the hot gases through tube 30 is regulated so as to maintainthe tube surface at the desired operating temperature, preferably about 650° F. (340° C.) to 950° F. (510° C.). Temperatures below 650° F. (340° C.) increase the risk of thermal shock in the glass when the glass is brought into contact with the relatively cooler tube. Tube temperatures above 950° F. (510° C.) are preferably avoided to prevent fusing and sticking of the tube to the glass. Typically the ambient atmosphere in a glass sheet heating furnace may be about 1300° F. (700° C.) and the temperature of the glass at the time of bending may be about 1100° F. (590° C.) to 1250° F. (680° C.). It may be desirable in some cases for the exit conduit 34 to have an extended length or to be provided with heat exchange means in order to reduce the temperature of the exhaust stream so as to avoid the need for high temperature duty pump or aspirator means.

Instead of drawing air from the furnace, an alternate arrangement encompassed by the invention entails the use of an independent air heater to supply hot air to the tube 30. In such an arrangement, conduit 32 may communicate with a tubular electrical resistance type of heater, for example, which in turn may be supplied with compressed air. The pump 35 or aspirator on the exhaust stream would not be required in that case.

Figure 5:
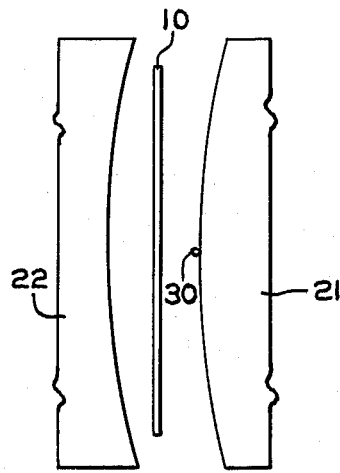
FIG. 5 is a schematic plan view of the press bending station of FIG. 3 in the open position.
Figure 6:
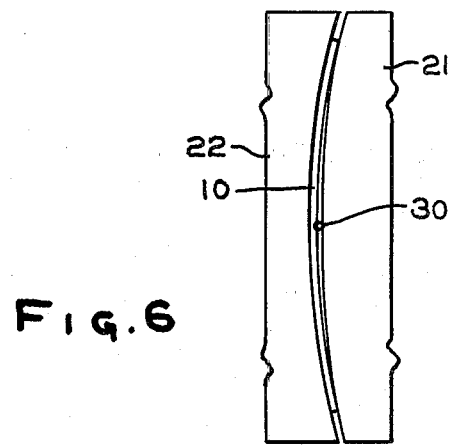
FIG. 6 is a schematic plan view of the press bending station of FIG. 3 in the closed position.

As viewed from above in FIG. 5, the glass sheet 10 has come to a stop in the bending station. In FIG. 6, the bending molds 21 and 22 have closed upon the glass sheet and the tube 30 has become pressed into the glass surface. Usually, the impression tube 30 is formed into the soft glass surface only a minor portion of the diameter of the rod. Thus, a slight gap in the vicinity of the rod may be provided between the glass sheet surface and the face of the mold to which the tube is attached when the molds are in full engagement with the glass sheet in order to prevent overbending of the glass sheet and excess impressing of the rod into the glass. Such a gap is shown in FIG. 6.

In order to assure the staightness and proper alignment of the tube 30, it may be desirable to cut a groove into the surface of the metal shaping plate which underlies the fiber glass cover 23 behind the tube 30 so that the tube will partially nest into the groove. It may also be helpful to provide a row of adjusting bolts 24 in direct alignment behind the tube 30 so as to provide accurate adjustability to the depth to which the tube is pressed into the glass along each portion of its length.

Usually, the final step of the process entails conveying each bent glass sheet out of the bending station into a tempering station, where it is rapidly cooled by blasts of air in order to temper the glass.

The foregoing description has dealt solely with accent lines which are straight lines, but it should be understood that the word "line" as used herein is intended to encompass curved lines as well as straight lines. Also included are pluralities of curved and/or straight lines producing patterns or figures on glass sheets. Other variations and modifications which are obvious to those of skill in the art may be resorted to without departing from the spirit and scope of the invention as set forth in the claims.

I claim:

1. A method for imparting an accent line to a glass sheet comprising:
heating a glass sheet to a softened condition; supporting the heated glass sheet in a press bending station between an opposed pair of complementary, substantially continuous shaping surfaces; supporting an elongated, tubular impression member between one side of the glass sheet and one of the shaping surfaces in alignment with the desired path of the accent line on the glass sheet; heating the tubular impression member by passing hot fluid therethrough; closing the bending molds upon the glass sheet and the impression member, thereby pressing the impression member into the glass surface and creating distortion in the glass sheet along the line of contact between the impression member and the glass; separating the mold members; and cooling the glass sheet.

2. The method of claim 1 wherein the impression member is maintained at a temperature above about 650° F. (340° C.) during the pressing step.

3. The method of claim 2 wherein the temperature of the impression member is maintained below about 950° F. (510° C.) during the pressing step.

4. The method of claim 2 or 3 wherein the tubular impression member is heated by passing hot gas therethrough.

5. The method of claim 4 wherein the glass sheet is heated in a furnace prior to being conveyed to the press bending station, and the hot gas is withdrawn from the atmosphere in the furnace.

6. The method of claim 5 wherein the hot gas is comprised chiefly of air.